2,976,261
ETHERS

Kuno Wagner and Erwin Müller, Leverkusen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware No Drawing. Filed Aug. 26, 1957, Ser. No. 680,407

Claims priority, application Germany Sept. 1, 1956

3 Claims. (Cl. 260—52)

This invention relates generally to the manufacture of ethers and more particularly to a novel method for making polyethers having terminal hydroxyl groups and N-methylol groups.

It has been proposed heretofore to condense a monofunctional or polyfunctional N-methylol compound with a monohydroxy alcohol. A large excess of a monofunctional alcohol is used when condensing it with a N-methylol compound to bring about uniform or orderly condensation. It has also been proposed heretofore to condense N,N'-dimethylol compounds with polyhydroxy alcohols but the heretofore available processes do not produce a condensate having a uniform structure. This non-uniformity or irregularity in the structure of the product is caused by various reactions other than the condensation occurring concurrently with the condensation.

Practically all N-polymethylol compounds are substantially insoluble or only slightly soluble in conventional organic solvents and the polyhydroxy compounds with which they are to be condensed, so the heretofore available processes are conducted in an aqueous medium. The quantity of water required is several times the quantity of water formed in the etherification and the presence of large quantities of water is undesirable because N-methylol compounds, such as amido-semiacetal derivatives, readily split off formaldehyde in the presence of water until an equilibrium between formaldehyde hydrates, amides and N-methylol compounds has been reached. Consequently, the number of N-methylol groups originally present is reduced in an uncontrollable manner and lengthening of the chain such as brought about by polymerization is impossible because the two components are not available in the calculated proportions. Moreover, the splitting off of water or water and formaldehyde can result in the formation of ring systems containing undesirable N,N'-methylene bonds, N,N'-methylene ether bonds or methylene ether groups. This can lead to the formation of sparingly soluble condensation products of low molecular weight which are soluble in the condensation mixture but cannot be dissolved after they have been isolated from the mixture.

Attempts have been made to avoid these difficulties by going through a two-step process in which the N-polymethylol compound is first etherified with a monofunctional alcohol to form a compound which is comparatively soluble in polyfunctional alcohols, such as, for example, ethylene glycol, a polyethylene glycol or butane diol. This product is then etherified with a polyfunctional alcohol. With secondary N-methylol derivatives, however, there is a tendency for cross-linking to occur prematurely through the NH groups which makes it necessary to stop the reaction prematurely with the result that not more than about one-half of the monofunctional alcohol can be removed in the second etherification process. With N-methylol derivatives, for example, those derivatives having methylol groups on tertiary nitrogen atoms, which cannot undergo such a cross-linking reaction, other secondary reactions often occur which prevent chain lengthening similar to the chain lengthening obtained in a polymerization process. For example, crystallized products or ring systems free from end groups are obtained by alkylating N,N'-dialkyl urea or thiourea derivatives. The heretofore available condensation products prepared in accordance with these heretofore available processes are unsuitable for many purposes, such as, for example, for use in the production of plastics by an isocyanate polyaddition process because of their non-uniform structure and unreproducible composition.

It is therefore an object of this invention to provide an improved process for making the condensation product of a N-methylol compound and a polyhydric alcohol. Another object of the invention is to provide a method for making polyethers by condensing a N-polymethylol compound with a polyhydroxy compound which polyethers are suitable for making polyurethane plastics. Still another object of the invention is to provide a method for making an improved polyether having terminal N-methylol groups and alcoholic hydroxyl groups.

Generally speaking, the foregoing objects and others are accomplished in accordance with this invention by providing a process wherein a N-polymethylol compound is condensed with a polyhydroxy alcohol containing at least one oxygen or sulfur ether atom connected to a carbon chain having more than two carbon atoms. Such a process produces a polyether having a substantially uniform structure and having a calculatable number of N-methylol or alcoholic hydroxyl terminal groups. Preferably, the condensation is accelerated by heating the two compounds together in the presence of an acid or a compound which splits off an acid during the condensation process. The condensation process may be conducted at temperatures of from about 50° C. to about 100° C. or higher.

Any suitable compound containing N-methylol groups may be used in the condensation process. Examples of such compounds include the methylol compounds of urea and thiourea, the methylol compounds of methylene diurea and methylene dithiourea, mixtures of dimethylol and trimethylol compounds of urea, thiourea, diurea or dithiourea, tetramethylol compounds of hydrazodicarbonamide, and hexamethylol compounds of melamine. Other examples of suitable N-methylol compounds include the dimethylol compound of hydrazodicarboxylic acid esters, the dimethylol compounds of ethylene urea and the dimethylol compounds of ethylene thiourea. The foregoing poly-N-methylol compounds have an effect on the solubility of polymethylol compounds of acid amides, guanidine derivatives, unsubstituted diurethanes, dicyandiamide derivatives or diurea derivatives, such as hexamethylene diurea making it possible to use such compounds in conjunction with polyalcohols. By this means, it is possible for mixtures of different N-polymethylol compounds to be reacted by the process according to this invention to provide N-methylol polyethers. In addition, compounds which have been etherified with monofunctional alcohols, preferably methanol, ethanol or butanol may be used if they contain N-polymethylol groups.

Any suitable polyhydroxy alcohol containing one or more oxygen ether or sulfur ether atoms connected to a carbon chain having more than two carbon atoms may be used to condense with the compound containing the N-polymethylol compound. Examples of such compounds are the hydroxyethyl derivatives of propylene glycols, the hydroxyethyl derivatives of butylene glycols, the hydroxyethyl derivatives of pentamethylene glycols, the hydroxyethyl derivatives of hexamethylene glycols, the hydroxyethyl derivatives of glycerine, the hydroxyethyl derivatives of trimethylol propane, the hydroxyethyl derivatives of pentaerythritol, the hydroxyethylated mono-fatty acid esters of polyhydroxy alcohols, such as, for example, the mono-fatty acid esters of hydroxyethylated trimethylol propane and the like. Polyethers prepared by polymerizing tetrahydrofuran and aromatic-aliphatic alcohols, such as are prepared by the reaction of ethylene oxide or propylene oxide with 4,4'-dihydroxydiphenyl-dimethylmethane or 4,4'-dihydroxydiphenyl sulfone, may also be used. Polyhydroxy compounds, such as hydroxyethylated derivatives of glycol urethanes and polyalcohols containing acetal or ether groups, hydroxyethylated derivatives of thiodiglycol, hydroxyethylated derivatives of polyethers, are also suitable.

Any suitable polyhydroxy alcohols which do not contain an ether bridge in the molecule, such as, for example, ethylene glycol, propylene glycol and butane diol may be mixed with polyhydroxy alcohols having an ether bridge and condensed with the compound containing the N-methylol groups to produce condensation products having characteristics desirable for making certain polyurethane plastics. For best results, the quantity of the alcohol not having ether groups should not exceed about 50% of the total polyhydroxy alcohol having ether groups.

Any inorganic or organic acid or any compound which during the condensation will split off an acid may be used as the catalyst. P-toluene sulfonic acid, benzene sulfonic acid, acetyl chloride, acetic acid anhydride, phosphoric acid, sulfuric acid, halogen acids such as hydrogen chloride, hydrogen bromide or hydrogen iodide, and any other suitable mineral acid may be used. Usually from about 0.01% to about 0.2% acid will be used although greater quantities may be used, if desired.

The presence of appreciable quantities of water during the condensation process should be avoided in order to avoid premature and undesirable cross-linking reaction. Such reaction may be avoided by diluting the mixture of polyhydroxy alcohol and compound containing N-polymethylol groups with a suitable organic solvent therefor. It has been found that the secondary reactions are avoided when the polyhydroxy alcohols used contain ether and thioether groups connected to carbon chains having more than two carbon atoms, such polyalcohols being capable of forming oxonium or sulfonium salts. The presence on the ether bonds of aliphatic radicals having more than two carbon atoms causes a sufficient solubility of the N-methylol polyethers in the organic solvent, such as, for example, benzene, toluene, chlorobenzene, cyclohexane, chloroform and the like, for these compounds to be used as solvents. Any other suitable organic solvents for the polyhydroxy compound and N-polymethylol compound may be used. In this manner, it is possible to avoid secondary reactions occurring when using polyethylene glycols or polyalcohols free from ether groups because of the lower solubility and solvation of the primary condensation.

The poly-N-methylol compounds used as starting materials in the condensation process to form the polyether are preferably prepared in the polyalcohol which will be condensed with the resulting N-methylol polyethers. In accordance with such a process, urea, for example, is reacted with suspended paraformaldehyde at temperatures preferably below 50° C. while dissolved in a polyhydroxy alcohol having ether groups in the presence of a small amount of an organic or inorganic base catalyst. The condensation of the resulting methylol urea with the polyhydroxy alcohol to form the N-methylol polyether is then achieved after dilution with a neutral organic solvent by rapidly raising the temperature of the resulting mixture of polyhydroxy alcohol and N,N'-dimethylol urea to from about 50° C. to about 100° C. and lowering the pH to from about 5.5 to about 6.5. The water formed during the condensation is removed azeotropically or by distillation at reduced pressure. It is essential to prevent an undesirable crystallization of the N-polymethylol compound; addition of small quantities of urea is often effective for this purpose.

It is, of course, possible for the N-polymethylol compounds to be prepared in the known conventional manner in the aqueous phase and extracted therefrom in vacuo after the polyalcohol required for the condensation according to the invention has been added to the reaction mixture while maintaining a neutral pH value. Thereafter, with adjustment to an acid pH value, the polycondensation of the resulting N-polymethylol and polyhydric alcohol to produce polyethers of high molecular weight is carried out with azeotropic removal of the water of condensation by means of a diluent or alternatively, if necessary, without a diluent but with removal of the water in vacuo.

If, instead of the N-polymethylol compounds, the ethers thereof formed with monofunctional alcohols are used, it will of course be the corresponding monomeric alcohol which is split off and removed instead of water during the condensation. The ether of a N-polymethylol compound can be added as such to the polyhydroxy alcohol. It is also possible for the etherification of the N-polymethanol compound to be carried out in the polyhydroxy alcohol required as solvent for the subsequent polycondensation. In the latter case, the monoalcohol, for example, methanol, used for the etherification could finally be regarded only as solution promoter between the N-methylol compound and the polyalcohol.

In accordance with the process of this invention, it is possible to obtain a good yield of condensates of a uniform structure with N-methylol terminal groups and alcoholic hydroxyl terminal groups in quantities which can be accurately predetermined. It is, for example, possible to produce linear polymer-like polyethers from dimethylol urea and butane-$\beta,\beta'$-dihydroxyethyl ether. Branched products can be obtained by using trifunctional ethers and ethers of higher function or alcohols containing thioether groups, or by introducing trifunctional N-methylol compounds, or such compounds of a higher functionality. If etherified N-polymethylol compounds are used or concurrently used, N-methylol polyethers with terminal hydroxyl and/or N-methylol alkyl ether groups are obtained, depending on the proportions of N-methylol polyether which are introduced.

The linear or branched N-methylol polyethers obtained according to the present invention by condensing a N-polymethylol compound and a polyhydric alcohol are generally fairly viscous liquid condensates up to average molecular weights of about 800, those N-methylol polyethers having an average molecular weight of approximately 2,000 or more are solid waxy products.

Owing to their uniform structure and the fact that the terminal groups thereof can be determined as regards nature and number, they are suitable for the production of plastics of high molecular weight, for example, using the isocyanate polyaddition process, and they have surprising activity, so that the reaction thereof with isocyanates does not have to be accelerated by the addition of activators. They can, moreover, be further modified in very many different ways, and thus, for example, existing N-methylol terminal groups can be reacted with diethanolamine, the result being basic polyethers with alcoholic terminal groups. By reaction of the NH groups within the polyether chains, methylol groups can be formed as side chains which are capable of being reacted with unsaturated acid amides, for example, with methacrylic acid amide, to provide soluble and polymerizable compounds.

The N-methylol polyethers to be produced according to the invention are consequently valuable intermediate products which are characterized by high stability, even with long storage. They have a high absorption power for fillers of all different types.

The polyethers having terminal alcoholic hydroxyl and N-methylol groups may be reacted with any suitable organic polyisocyanate to form a polyurethane plastic. By proper choice of cross-linker, either a cellular product or a rubber-like non-porous product may be formed. Examples of suitable organic polyisocyanates include 2,4-toluylene diisocyanate, 2,6-toluylene diisocyanate, 1,5-naphthalene diisocyanate and the other polyisocyanates disclosed in U.S. Patent 2,764,565. The apparatus and process disclosed in that patent may be used for mixing the polyether of this invention with the organic diisocyanate and suitable catalyst, if desired. Any suitable catalyst, including those disclosed in U.S. 2,764,565, may be used. The polyether should have a molecular weight of at least about 750 and, preferably, about 1000 or more.

Example 1

About 600 parts by weight of paraformaldehyde are suspended at room temperature and while stirring in 1780 parts by weight of butane-$\beta,\beta'$-dihydroxyethyl ether. A solution of about 1.68 parts by weight of potassium hydroxide dissolved in about 3 parts by volume water is then added to the suspension. After about 15–20 minutes, the most of the paraformaldehyde has dissolved. About 600 parts by weight of powdered urea are then added to the solution and the temperature is slowly raised to about 50° C. After about 30–40 minutes at this temperature, the formation of dimethylol urea in a quantity equivalent to the diol is practically completed. By quickly adding about 5.6 parts by weight of p-toluene sulfonic acid and about 900 parts by volume of benzene and by raising the temperature to about 80° C., provision is made for the etherification to start quickly and for dimethylol urea to be prevented from separating out. After the temperature of about 80° C. has been reached, any water formed is continuously distilled off azeotropically. About 300 parts by volume of water are removed in about 24 hours. After neutralization with about 0.13 part by weight of potassium hydroxide and removal of the benzene in vacuo, a soluble dimethylol urea-polyether with a melt viscosity of 2400 cp. at 75° C. and an average molecular weight of 780 having N-methylol groups and alcoholic terminal hydroxyl groups is obtained.

If the condensation is not stopped and the water formed is removed with benzene over soda lime, products of good solubility which have a melt viscosity of up to about 9850 centipoises at 75° C. and a mean molecular weight of about 2000 are obtained.

If the water formed is removed by vacuum distillation at about 60° C. instead of azeotropically, a polyether which is not cross-linked and has a melt viscosity of about 5888 centipoises at 75° C. is obtained after about 48 hours.

Example 2

The procedure is the same as described in Example 1 except that about 900 parts by weight of paraformaldehyde are used. In a reaction proceeding in analogous manner, using the same quantities of catalyst and the same quantities of benzene, and with etherification of the trimethylol and dimethylol urea mixture formed and azeotropic removal of about 300 parts by volume of water, a soluble branched polymethylol urea-polyether which has a viscosity of about 1051 centipoises at 75° C. is obtained, and this can be converted by further condensation for 8 hours to a soluble polyether of relatively high molecular weight and having a viscosity of 3,000 centipoises at 75° C.

Example 3

The procedure is the same as in Example 1 with the exception that the formation of dimethylol urea is carried out in a polyalcohol mixture of about 670 parts by weight of hexanetriol and about 970 parts by weight of butane-$\beta,\beta'$-dihydroxyethyl ether. After the azeotropic removal of about 300 parts by volume water, a water-soluble condensate which is not cross-linked and which has a melt viscosity of about 22645 centipoises at 75° C. is obtained.

When about 750 parts by weight of paraformaldehyde are used for the preparation of the methylol ureas instead of the 600 parts by weight referred to in Example 1, a soluble branched polyether with a melt viscosity of about 4989 centipoises at 75° C. is obtained after about 310 parts by volume of water have been removed azeotropically.

Example 4

The process of Example 1 is followed except that initially only about 1602 parts by weight of butane-$\beta,\beta'$-dihydroxyethyl ether are used for the formation of the dimethylol urea and, after the formation of said urea has taken place, about 316 parts by weight of hydroxyethylated 4,4'-dihydroxydiphenyl dimethyl methane are added and, using the same quantity of catalyst as in Example 1, a viscous polycondensate which is not cross-linked and which has a melt viscosity of about 3500 centipoises at 75° C. is obtained after removal of about 300 parts by volume of water.

When about 890 parts by weight of butane-$\beta,\beta'$-dihydroxyethyl ether and about 1380 parts by weight of hydroxyethylated trimethylolpropane are used as solvent for the formation of dimethylol urea, using the same working method, the result is a material which is not cross-linked and which has a melt viscosity of about 1200 centipoises at 75° C., and this material can be transformed by further gentle condensation at about 80° C. into a condensate with a melt viscosity of about 4,000 centipoises at 75° C.

When a mixture of about 890 parts by weight of butane-$\beta,\beta'$-dihydroxyethyl ether and about 2705 parts by weight of an esterification product obtained from 1 mol of hydroxyethylated trimethylolpropane and 1 mol of oleic acid is used as solvent for the formation of the dimethylol urea, a polycondensate with a melt viscosity of about 978 centipoises at 75° C. is obtained after about 300 parts by volume of water have been removed azeotropically, this polycondensate not being cross-linked, having good solubility and being emulsifiable in water.

When about 1530 parts by weight of a tetrabutylene glycol polyether and about 890 parts by weight of butane-$\beta,\beta'$-dihydroxy ethyl ether are used as solvent for the formation of dimethylol urea, a waxy dimethylol urea-polyether which has a melt viscosity of about 3890 centipoises at 75° C. is obtained.

Example 5

The procedure is analogous to that of Example 1, but about 1068 parts by weight of butane-$\beta,\beta'$-dihydroxyethyl ether and about 488 parts by weight of thiodiglycol are used as solvent for the formation of dimethylol urea and complete transformation is achieved in the course of about one hour without adding an alkali catalyst. As in Exampe 1, after azeotropic removal of about 305 parts by volume of water, a water-repelling polycondensate which is not cross-linked and which has a melt viscosity of about 1051 centipoises at 75° C. is obtained. By further removal of the water with progressive condensation, a polycondensate with a viscosity of about 9850 centipoises at 75° C. is obtained.

Example 6

A solution of about 228 parts by weight of tetramethylol hydrazodicarbonamide in about 520 parts by volume of water and about 180 parts by weight of butane dihydroxyethyl glycol is largely freed from water in the course of 2 hours, and is etherified by adding about 0.058 part by weight of p-toluene sulfonic acid in the course of 8 hours. A water-soluble polycondensate which is not cross-linked and which has terminal methylol and hydroxyl groups is obtained, and this polycondensate can withstand storage for months without clouding.

Example 7

About 600 parts by weight of paraformaldehyde are suspended in about 1780 parts by weight of butane-β,β'-dihydroxyethyl ether at room temperature and a solution of about 1.68 parts by weight of potassium hydroxide in about 3 parts by volume in water is added to this suspension while stirring. After about 20 minutes, the main part of hte paraformaldehyde has dissolved. About 760 parts by weight of thiourea are now added to this solution and the temperature is raised slowly to about 50° C. After about 30 minutes, about 5.62 parts by weight of p-toluene sulfonic acid and about 900 parts by volume of benzene are added and the temperature quickly raised to about 80° C. With the polycondensation according to Example 1, a soluble polycondensate with a melt viscosity of 1900 centipoises at 75° C. is obtained in a time about two and one-half times as long.

When about 860 parts by weight of ethylene urea are used instead of 760 parts by weight of thiourea, a viscous soluble polycondensate with an hydroxyl number of about 48 and a melt viscosity of about 970 centipoises at 75° C. is obtained after 12 hours by polycondensation, after azeotropic removal of about 320 parts by volume of water and after adding another about 0.5 part by weight of p-toluene sulfonic acid.

Example 8

From a boiling solution of about 178 parts by weight of butane-β,β'-dihydroxyethyl ether, about 148 parts by weight of dimethylol urea-dimethyl ether and about 0.1 part by weight of phosphoric acid in about 200 parts by volume of chloroform, the methanol formed is removed azeotropically with continuous addition of chloroform. After 8 hours, a soluble dimethylol urea polyether having terminal methoxyl and hydroxyl groups is obtained. If the condensation takes place without solvent and with removal of the methanol in vacuo, at an internal temperature of 50–60° C., a cross-linked, insoluble and jelly-like polycondensate is obtained after removabl of only half the calculated quantitty of methanol.

Example 9

The procedure is analogous to that of Example 8, but about 134 parts by weight of dipropylene glycol are used and condensation is carried out for 8 hours. Without premature cross-linking, a viscous polyether, which can be transformed by further condensation in chloroform-benzene into a soluble condensate of relatively high molecular weight and having a melt viscosity of 5,000 centipoises at 75° C., is obtained.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

The polyethers provided by this invention are useful in the preparation of polyurethane plastics by reacting them with an organic polyisocyanate. The polurethanes can be used for making vehicle tires, sponges, coatings, thermal insulation and various other articles of manufacture.

What is claimed is:

1. A method for making a water soluble condensation product which comprises condensing by heating under acid conditions in an inert organic solvent which forms an azeotropic with water a mixture of (1) a compound containing at least two terminal groups selected from the class consisting of N-methylol groups and etherification products of N-methylol groups and monohydroxy alcohols having from 1 to 4 carbon atoms and (2) a polyhydric alcohol selected from the group consisting of an hydroxyethyl ether of propylene glycol, an hydroxyethyl ether of butylene glycol, an hydroxyethyl ether of pentamethylene glycol, an hydroxyethyl ether of hexamethylene glycol, an hydroxyethyl ether of glycerine, an hydroxyethyl ether of trimethylolpropane, an hydroxyethyl ether of pentaerythritol, an hydroxyethyl ether of thiodiglycol, an hydroxyethyl ether of 4,4'-dihydroxydiphenyldimethylmethane, an hydroxypropyl ether of 4,4'-dihydroxydiphenyldimethylmethane, an hydroxyethyl ether of 4,4'-dihydroxydiphenyl sulfone, an hydroxypropyl ether of 4,4'-dihydroxydiphenyl sulfone, and polytetramethylene ether glycol while removing the water of condensation as rapidly as it is formed by azeotropic distillation; said compound having N-methylol groups having been prepared by reacting at a temperature below about 50° C., formaldehyde and a member selected from the group consisting of urea, thiourea, diurea, dithiourea, hydrazodicarbonamide, ethylene urea, ethylene thiourea, and melamine; said compound (1) being substantially water free when mixed with said inert organic solvent.

2. The process of claim 1 wherein the said compound having N-methylol groups is dimethylol urea.

3. A method for making a water soluble condensation product which comprises condensing by heating in an inert organic solvent which forms an azeotropic with water a mixture of (1) a compound containing at least two terminal groups selected from the class consisting of N-methylol groups and the etherification products of N-methylol groups and monohydroxy alcohols having from 1 to 4 carbon atoms and (2) a polyhydric alcohol selected from the group consisting of an hydroxyethyl ether of propylene glycol, an hydroxyethyl ether of butylene glycol, an hydroxyethyl ether of pentamethylene glycol, an hydroxyethyl ether of hexamethylene glycol, an hydroxyethyl ether of glycerine, an hydroxyethyl ether of trimethylolpropane, an hydroxyethyl ether of pentaerythritol, an hydroxyethyl ether of thiodiglycol, an hydroxyethyl ether of 4,4'-dihydroxydiphenyldimethylmethane, an hydroxypropyl ether of 4,4'-didhydroxydiphenyldimethylmethane, an hydroxyethyl ether of 4,4'-dihydroxydiphenyl sulfone, an hydroxypropyl ether of 4,4'-dihydroxydiphenyl sulfone, and polytetramethylene ether glycol while removing the water of condensation as rapidly as it is formed by azeotropic distillation; said compound having N-methylol groups having been prepared by adding a member selected from the group consisting of urea, thiourea, dithiourea, hydrazocarbonamide, ethylene urea, ethylene thiourea, and melamine to said polyhydric alcohol and reacting the mixture at a temperature below about 50° C. until the N-methylol compound has been formed; said compound having N-methylol groups and said polyhydric alcohol being substantially water free when mixed with said inert organic solvent.

References Cited in the file of this patent

UNITED STATES PATENTS

| 2,350,894 | Honel | June 6, 1944 |
| 2,447,621 | Smidth | Aug. 24, 1948 |
| 2,514,505 | Morton | July 11, 1950 |
| 2,606,885 | Schmutzler | Aug. 12, 1952 |
| 2,763,649 | Albrecht et al. | Sept. 18, 1956 |
| 2,892,810 | Albrecht | June 30, 1959 |